Jan. 9, 1962 C. J. SMITH ETAL 3,016,049
VEHICLE POWER STEERING CONTROL DEVICE
Filed Oct. 22, 1959 4 Sheets-Sheet 1
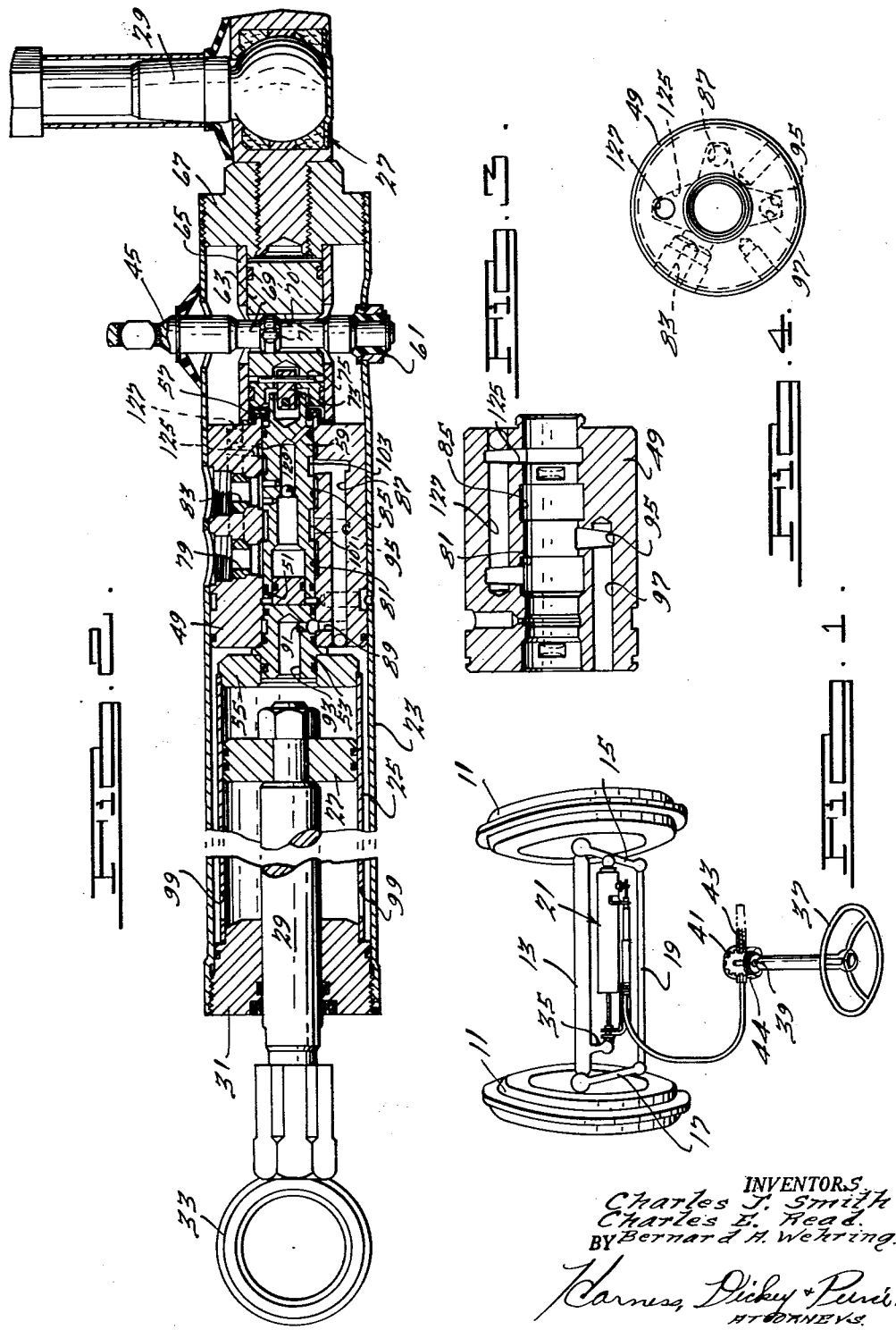
INVENTORS.
Charles J. Smith
Charles E. Read
BY Bernard H. Wehring.
Harness, Dickey & Pierce
ATTORNEYS.

Jan. 9, 1962   C. J. SMITH ETAL   3,016,049
VEHICLE POWER STEERING CONTROL DEVICE
Filed Oct. 22, 1959   4 Sheets-Sheet 2
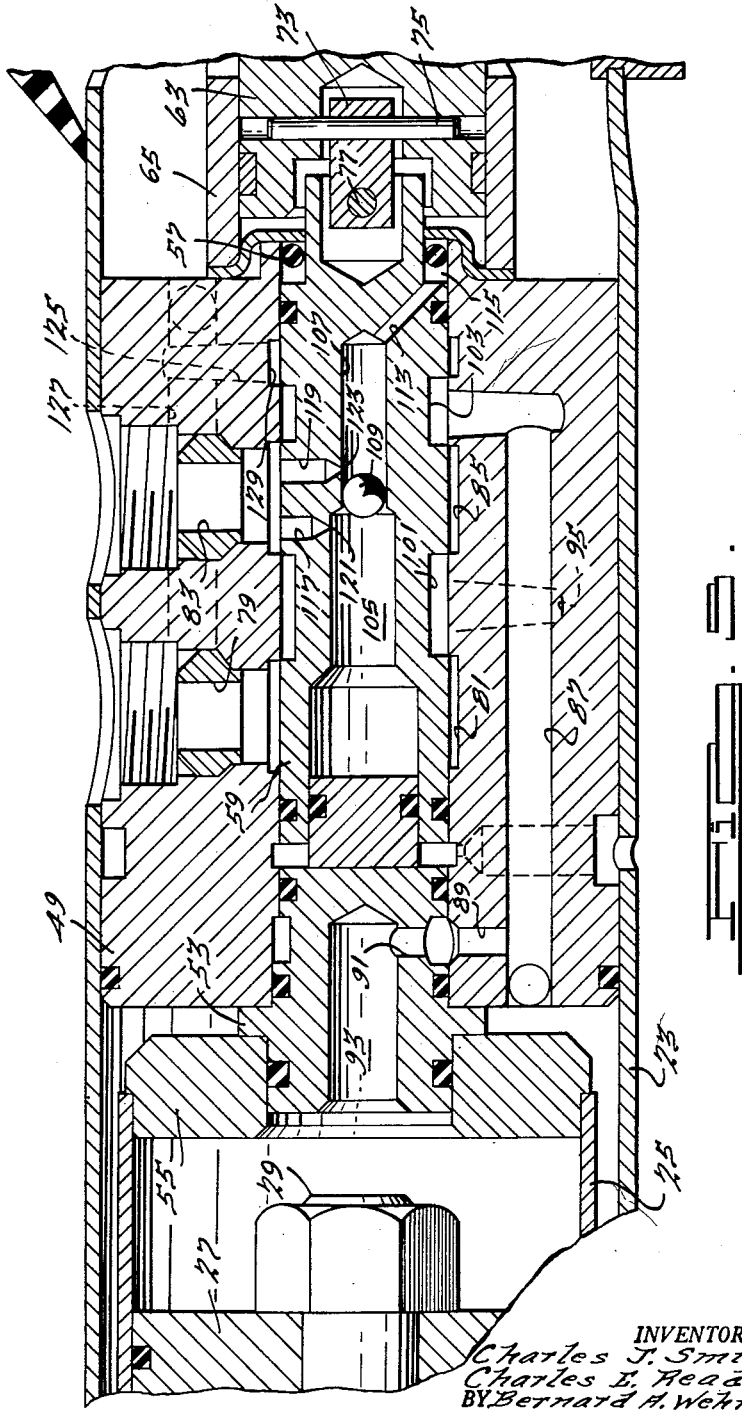
INVENTORS.
Charles J. Smith.
Charles L. Read.
BY Bernard A. Wehring.
Barnes, Dickey & Pierce.
ATTORNEYS.

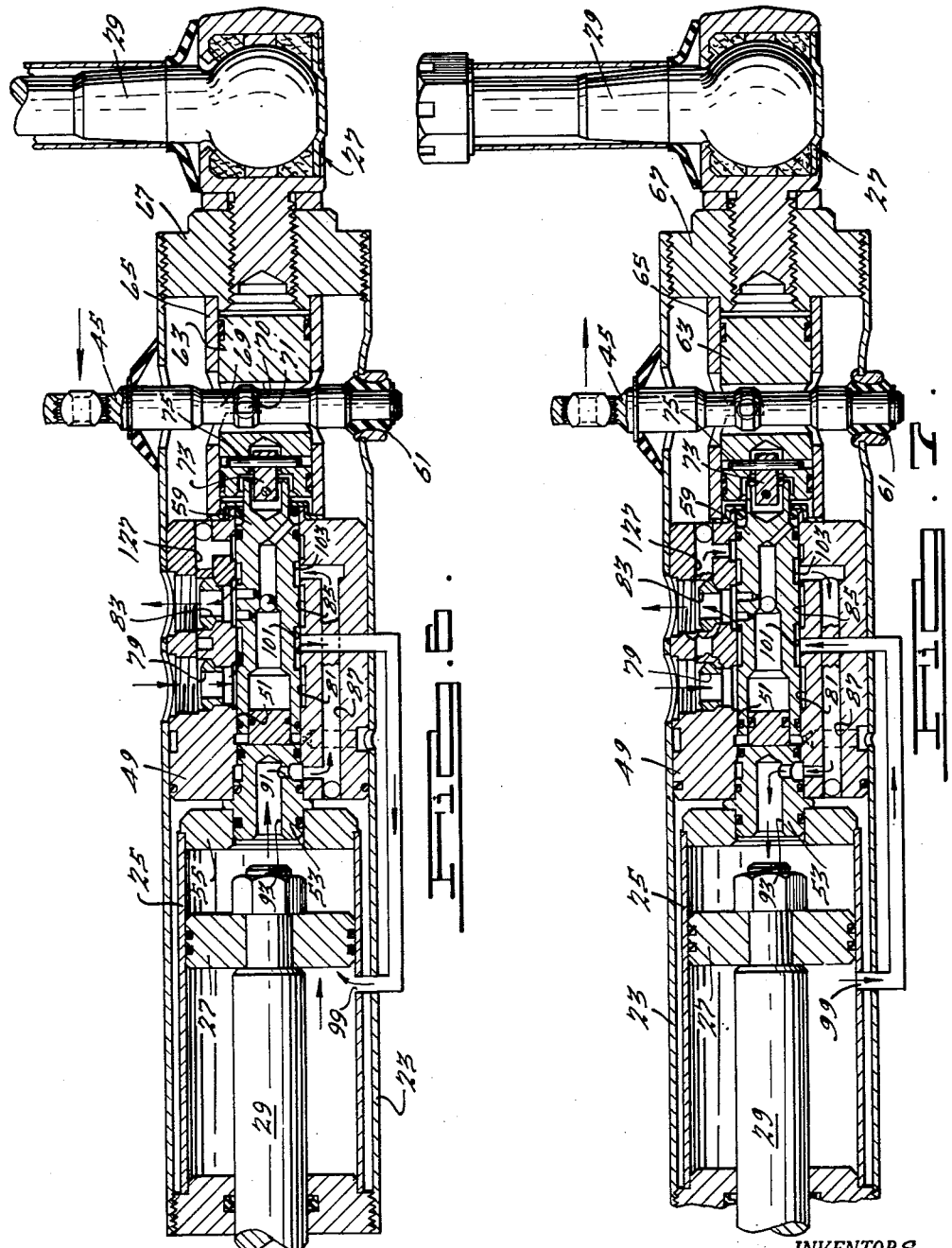

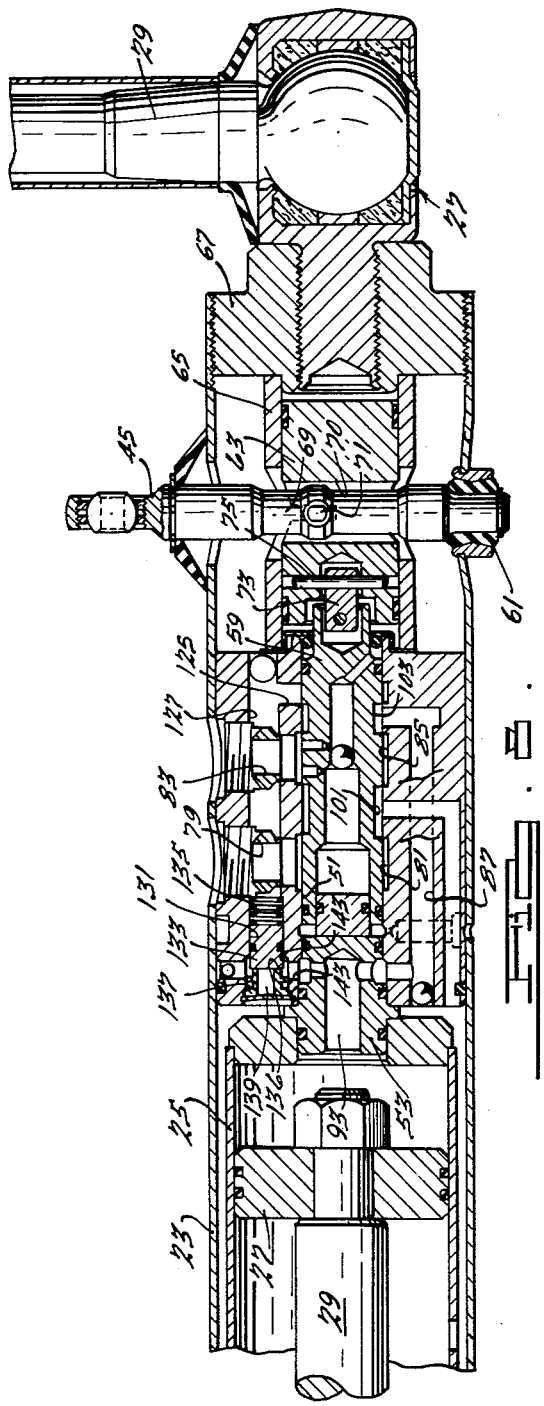

Patented Jan. 9, 1962

1

3,016,049
VEHICLE POWER STEERING CONTROL DEVICE
Charles J. Smith, Charles E. Read, and Bernard A. Wehring, Monroe, Mich., assignors to Monroe Auto Equipment Company, Monroe, Mich., a corporation of Michigan
Filed Oct. 22, 1959, Ser. No. 847,962
6 Claims. (Cl. 121—46.5)

This invention relates generally to a vehicle power steering device and more particularly to an improved power steering control valve.

In the past, many hydraulic power steering devices and control valves have been developed for use on vehicles. Such control valves are normally actuated through a steering gear mechanism in which the force required to actuate the control valve has not been of any real importance. Recently, in order to reduce the cost of vehicle power steering devices, it has been proposed to eliminate expensive steering gears and to actuate power steering control valves through a cable or the like. When such an arrangement is used, it is imperative that the control valve be easily movable with the exertion of only a very low force. Presently-known power steering control valves do not operate satisfactorily in such a system because the control valve element is normally centered by hydraulic pressure and/or mechanical springs, and considerable force is required to actuate the valve element against the forces exerted by the hydraulic pressure or mechanical spring.

It is, therefore, an object of this invention to provide a vehicle power steering device incorporating a control valve which can be actuated by the application of extremely low forces thereto, and in which the movable valve element is dampened against vibration or chattering, and the vehicle driver still has a sense of road or ground feel when steering and driving the vehicle.

It is a still further object of this invention to provide an improved power steering control valve of the aforementioned type which may be operated by a cable or the like in which the hydraulic forces acting against the various elements of the power steering device are controlled and calibrated to permit extremely easy operation while simultaneously providing an efficient operating unit.

It is a still further object of the invention to provide a power steering control valve incorporating a pressure relief valve which will effectively relieve pressures within the power steering system when the vehicle is being towed so that the wheels of the vehicle can turn and will not be locked up by hydraulic pressure within the system.

It is a still further object of this invention to provide a power steering device of the aforementioned type which is relatively simple in construction, positive in operation and durable in use.

These and other objects and advantages of the present invention will become apparent from the following detailed description taken in conjunction with the accompanying drawings in which:

FIGURE 1 is a fragmentary, diagrammatic, plan view illustrating a power steering device of this invention associated with a steering shaft and wheels of a vehicle;

FIG. 2 is a fragmentary sectional view of the power steering device of this invention;

FIG. 3 is a sectional view of the valve body illustrated in FIG. 2, shown in a position rotated 90° relative to the position shown in FIG. 2;

FIG. 4 is an end elevational view of the structure illustrated in FIG. 3;

FIG. 5 is an enlarged sectional view of a portion of the structure illustrated in FIG. 2;

FIG. 6 is a view similar to FIG. 2, but partially diagrammatic in nature, showing the position of the valve parts when the valve has been shifted to the left so as to cause the piston to move inwardly in the cylinder;

FIG. 7 is a view similar to FIG. 6, showing the position of the valve parts when the valve has been shifted to the right so as to cause the piston rod to move to the left; and FIG. 8 is a view similar to FIG. 2, illustrating a still further embodiment of the invention in which a pressure relief or towing valve is provided in the power steering system.

Referring now to the drawings, it will be seen that a portion of a vehicle is illustrated including a pair of ground-engaging wheels 11 rotatably and turnably supported on a cross member or fixed axle 13 in any suitable manner. A pair of steering links 15 and 17 are suitably connected with the axle and wheels so that swinging movement thereof will cause the wheels to turn. The links 15 and 17 are interconnected by a tie rod 19. The power steering device of this invention, which is indicated generally at 21, is illustrated as extending laterally of the vehicle, although the invention is not so limited, and includes a cylindrical housing 23 in one end of which a cylinder 25 is fixedly supported. A bore-fitting piston 27 is disposed in the cylinder 25 and has a piston rod 29 connected thereto and extending through and beyond a cylinder closure member 31. One end of the housing 23 carries a socket-type fitting 27 in which a ball stud 29 is supported and the ball stud 29 is connected with the steering link 15 intermediate the ends thereof. The free end of the piston rod 29 carries a fitting 33 which in turn is pivotally connected with axle 13 at 35 so that relative movement between the piston rod and the housing 23 will cause relative movement between the vehicle axle 13 and the steering links 15 and 17 to cause turning of the wheels 11 relative to the axle.

The vehicle is provided with a steering wheel 37 disposed in position for actuation by the vehicle operator and the steering wheel is connected in a conventional manner with a steering shaft 39 which in turn has a gear 41 on the lower end thereof, which gear meshes with spirally wound wire on the exterior of a cable 43. The cable 43 may be of any suitable type, but preferably is of the type sold under the trade mark "Teleflex," manufactured by Teleflex, Inc., so that rotation of the gear 41 causes lineal movement of the cable 43. The cable 43 is in turn movably supported in a suitable housing or guide structure of any suitable type, and has one end connected to a power steering control valve actuating lever or pin 45 which is supported in the housing 23 as will be hereinafter described. Rotation of the vehicle steering wheel 37 in one direction or another will cause lineal movement of the cable 43 which in turn will cause the upper end of the power steering actuating pin or lever 45 to pivot relative to the housing to actuate the power steering control valve as will be hereinafter brought out. A friction clutch 44 is disposed between gear 41 and the steering shaft so that if the force required to actuate the cable 43 exceeds a predetermined low force, the clutch will slip and thus the cable will not be damaged or overloaded. The force required to actuate the power steering control valve pin 45 must be low enough that the clutch 44 will not slip if steering of the vehicle is to be obtained.

It will be appreciated that with this arrangement it is imperative that the force required to actuate the power steering control valve must be relatively low, and thus the novel control valve of this invention has been devised. As can be seen in FIGS. 2 to 4, the control valve includes a valve body 49 fixedly supported in the housing 23 adjacent to one end of the cylinder 25. The valve body is provided with a longitudinal central bore 51, one end of which is closed by means of a plug 53 which is disposed between a closure member 55 for one end of the cylinder 25 and the adjacent end of the valve body 49. The opposite end of the bore is closed by means of an O-ring 57 supported in the valve body by a suitable retainer and which is disposed between the wall of the valve body bore 51 and a reduced end portion of a valve spool 59. The valve spool is movably supported in the valve body bore 51 and is adapted to be actuated by movement of the pin or lever 45. In this connection, the lower end of the lever 45 is pivotally supported in the housing 23 through a mounting assembly 61 while the upper end of the lever 45 is connected to the cable 43. Movement of the cable causes the lever to pivot about the mounting assembly 61 and the intermediate portion of the lever 45 extends through a movable guide 63 slidably supported in a spacer tube 65 which in turn is supported by the valve body 49 and an end plug 67 mounted in the right-hand end of the housing 23.

The lever has an intermediate land portion 69 which engages the wall of an aperture 70 extending through the guide 63 and the guide 63 is slotted to receive a pin 71 which extends through the lever 45 so as to connect the guide and lever for movement. In view of the fact that the overall length of the lever 45 is more than twice the distance between the mounting assembly 61, where the lever is pivotally connected to the housing 23, and the land 69, which engages guide 63, a mechanical advantage in excess of 2 to 1 is obtained for actuating the lever 45 with the cable 43. Thus, a substantial mechanical advantage is obtained between the cable 43 and the valve guide 63 to reduce the effort required to move the valve guide 63. Valve guide 63 is connected with the valve spool 59 by means of a pin 73 and roll pins 75 and 77; thus interconnecting the guide and the spool for movement longitudinally of housing 23 and preventing any loads from being imparted from the guide 63 to the spool which would cause binding of the spool in the valve body 49.

The valve body 49 is provided with a fluid inlet passage 79 which is adapted to be connected by a suitable conduit with a fluid pump so that fluid under pressure will flow from a pump driven by the vehicle engine into the passage 79, which at its inner end communicates with an annulus 81 adjacent the valve body bore 51. A second or fluid outlet passage 83 is provided in the valve body which is adapted to be connected by a conduit to a fluid reservoir or sump (not shown) and the passage 83 communicates at its inner end with an annulus 85 adjacent the valve body bore 51. The valve body 49 is provided with cored passages 87 and 89 which communicate with passageways 91 and 93 in the plug 53 and communicate with the interior of the cylinder 25 on the right-hand side of the piston 27. This group of passages constitute passageway means which communicate valve body bore 51 with the right-hand end of cylinder 25. The valve body 49, in addition, is provided with cored passages 95 and 97 which communicate bore 51 (FIG. 3) with the space between the outer diameter of cylinder 25 and the inner diameter of housing 23. This space communicates with an aperture 97 in the wall of cylinder 25, adjacent the left end thereof, so that passageway means are provided communicating valve body bore 51 with cylinder 25 on the left side of piston 27.

The valve spool 59 is provided with a pair of spaced annular grooves 101 and 103 in the outer periphery thereof which are adapted to communicate the pressure and sump passages 79 and 83 with the passages 87 and 95 which lead to the cylinder 25 on opposite sides of the piston 27. The valve spool 59 is formed or drilled to provide a pair of opposed internal chambers 105 and 107 which are separated from each other by a ball 109. The left-hand end of the chamber 105 is closed by means of a piston or plunger 111 while the right-hand end of the chamber 105 communicates through a passage 113 with a chamber 115 provided between O-ring 57, valve body bore 51 and the reduced end portion of the valve spool. Each of the chambers 105 and 107 communicates at all times with the annulus 85 of the sump passage 83 through passages 117 and 119, the inner ends of which terminate in restricted orifices 121 and 123. The chamber 105 and the chambers 107 and 115 act as opposed reaction or dash pot chambers which, because they communicate only with the sump passage 83, contain fluid at relatively low pressure. The orifices 121 and 123, which are approximately twenty thousandths of an inch (.020″) in diameter, act to restrict the flow of fluid from the chambers 105 and 107 into the sump passage 83, thereby dampening movement of the valve spool 59 and eliminating chatter or vibration which is very undesirable in a power steering system and providing some resistance to spool movement which in turn gives the vehicle driver some sense of road or ground feel.

When the power steering control valve is disposed in the neutral position illustrated in FIG. 2, the cylinder 25 on both sides of the piston 27 communicates with the sump passage 83. However, some leakage of fluid under pressure from pressure passage 79 to spool grooves 101 and 103 will occur, so that the cylinder 25 and sump passage 83 will contain fluid under pressure of the order of 50 to 125 pounds. It should also be noted that pressure passage 79 communicates with a second pressure passage 125 in valve body 49 through a horizontal passage 127. The passage 125 communicates with an annulus 129 in the wall of valve body bore 51 so that when spool 59 is moved to the right, passage 125 and pressure passage 79 communicate with the right-hand end of cylinder 25 through spool annulus 103 and passages 87, 89 and 93.

When it is desired to steer the vehicle, the cable 43 is actuated by the steering wheel 37 so as to pivot the lever 45 in one direction or the other. As can be best seen in FIG. 6, if the upper end of the lever is moved to the left, so as to move the valve spool 59 to the left, the pressure passage 79 will communicate with passageways 95 and 97 and with the cylinder 25 on the left-hand side of the piston 27. Cylinder 25, on the opposite side of the piston 27, is connected through the passageways 93, 91, 89 and 87, and spool groove 103 and annulus 85 to sump passage 83. The piston 27 is thus moved by fluid under pressure inwardly toward the lever 45, and will cause the vehicle wheels 11 to turn to the left as viewed in FIG. 1. When the valve spool 59 moves to the left, fluid in the valve spool chamber 105 will be forced upwardly through the restricted orifice 121 and passage 117 into the sump passage 83. Due to the pressure of the restricted orifice 121, the fluid in chamber 105 can not flow freely to sump passage 83 but rather must be squeezed through the restricted orifice, thus preventing free play or movement of the valve spool and providing some damping or resistance to spool movement. The damping or resistance, while being sufficient to stabilize the valve spool, is still low enough so that only 2 to 4 pounds of force must be applied through the cable to the upper end of the lever 45, under normal conditions, to move the valve spool and thus effect power steering of the vehicle wheels.

When the upper end of the lever 45 is pivoted or moved to the right, as illustrated in FIG. 7, the valve spool 59 is likewise moved to the right, thus communicating the cylinder 25 on the right-hand side of the piston 27 with the pressure passages 79 and 125, as described, and communicating the cylinder on the opposite side of the piston with the sump passage 83, thereby providing power to turn the vehicle wheels 11 to the right as previously described.

When the valve spool 59 moves to the right, fluid in the chamber 107 will be squeezed therefrom through the restricted orifice 123 and passage 119 to the sump passage 83, thus providing substantially the same damping reaction and resistance to movement as previously described in conjunction with the chamber 105.

It will thus be appreciated that with the pressure control valve described, the vehicle wheels can be turned by the application of only a very small force to the upper end of the lever 45, while at the same time, sufficient damping action and resistance to movement of the valve spool is obtained to prevent the valve spool from chattering, vibrating or otherwise having undesirable movement. Also, sufficient fluid pressures are present in the system to provide "road feel" for the driver of the vehicle.

In the embodiment of the invention illustrated in FIG. 8, the control valve illustrated is substantially identical to that previously described except for the addition of a pressure relief valve which acts as a "towing" valve. It will be appreciated that it is not possible to manually steer a vehicle which incorporates the power steering mechanism previously described. It, furthermore, will be appreciated that if the vehicle engine ceases to function so that the vehicle must be towed, the power steering system will be inoperative but will be full of fluid and the vehicle ground-engaging wheels 11 may have difficulty turning when towed by another vehicle.

A pressure relief valve, which will function satisfactorily in this connection, is illustrated as mounted in the valve body 49 which is provided with a bore 131 in which a relief valve spool 133 is slidably disposed. A coil spring 135 is disposed between the right-hand end of the valve spool 133 and a suitable abutment at the right end of the valve body bore 131 for resiliently urging the valve spool into engagement with a valve seat 136 provided at one end of a plug member 137 which is supported in the valve body at the left end of bore 131. The bore 131 communicates with pressure passage 79, previously described, so that when the power steering system is operating the valve spool 133 is held against the valve seat 136 by the spring 135 and the pressure of fluid in the pressure passage 79, thus keeping the valve spool closed under all normal conditions when the power steering system is in operation. However, when the power steering pump is not operating, then, of course, the pressure in the passage 79 is materially reduced and the valve spool can move away from its seat to permit the pressure relief valve to function as will hereinafter appear.

The plug 137 is provided with a central aperture 139 which communicates with the space between the cylinder 25 and the housing 23 and thus through the cylinder hole 99 with the interior of the cylinder on the left-hand side of the piston 27. A passageway 141 is provided in the plug 53 for communicating the passage 93 with the bore 131 of the pressure relief valve and in this connection an annulus 143 is provided in the valve body 49 adjacent the bore 131. The annulus 143 communicates with the left-hand face of the valve spool 133 as does the passageway 139. In view of the fact that the passageway 139 communicates with the cylinder 25 on the left-hand side of the piston and the annulus 143, passage 141 and passage 93 communicate with the cylinder 25 on the right-hand side of the piston 27, it will be appreciated that if the fluid pressure in either the passageway 139 or the annulus 143 exceeds the pressure acting against the right-hand end of the valve spool 133, the valve spool will be moved to the right off of its seat and out of engagement with the plug 137, thus communicating the portions of the cylinder 25 on opposite sides of the piston 27 so that fluid can flow from one side of the piston to the opposite side thereof and thus relieve any fluid pressures tending to prevent movement of the piston 27 when the vehicle is being towed.

Because the piston rod 29 occupies a considerable portion of the volume of the cylinder 25 on the left-hand side of the piston 27, all of the fluid on the right-hand of the piston cannot flow to the left-hand side of the piston and a portion thereof must flow back to the sump passage 83 in the same manner as previously described wherein fluid from the left-hand side of the piston flows to sump. Conversely, when the piston moves to the left during towing of the vehicle, fluid flowing from the left-hand side of the cylinder through the pressure relief valve to the right-hand side is not sufficient to keep the right-hand side of the cylinder filled with fluid, therefore, fluid must flow from the sump passageway 83 into the right-hand side of the cylinder to keep the same filled at all times.

It will thus be appreciated that by applying this small and relatively simple pressure relief valve in the power steering pressure control valve, a simple arrangement is provided for relieving any towing problems that may arise without affecting the operation of the power steering system when the same is operating. It will, of course, be appreciated that if desired, the valve spool 133 could be locked in engagement with its valve seat by suitable means so that the pressure relief valve could not operate during normal operation of the power steering system. Such locking means could be disengaged from the valve spool 133 when it is desired to tow the vehicle, thus freeing the pressure relief valve for operation as previously described.

What is claimed is:

1. A power steering control valve including housing means having a bore, a valve spool slidably disposed in said housing means bore, said housing means having a first passage communicating with said bore and adapted to be connected to a source of fluid under pressure, a second passage communicating with said bore and adapted to be connected to a fluid reservoir and third and fourth passages communicating with said bore and adapted to be connected to a fluid motor for directing fluid thereto, said spool having spaced grooves therein adapted to communicate said first and second housing means passages with said third and fourth passages so as to control fluid flow through said valve, means for damping said valve spool against vibrations and undesired movement while still permitting easy manual shifting of said valve spool, said means including portions of said housing means and of said valve spool defining opposed chambers for containing fluid which will react in opposite directions against said valve spool, passage means connecting each of said chambers to said housing means second passage in all positions of movement of said valve spool in said housing means, each of said chamber passage means including a restricted orifice to substantially restrict the flow of fluid from each of said chambers to said housing means second passage upon movement of said valve spool relative to said housing means, and actuating means movably supported on said housing means and operatively connected with said valve spool for moving the same in opposite directions and thus actuating said control valve.

2. A power steering control valve including housing means, a valve spool slidably disposed in said housing means, said housing means having a first passage adapted to be connected to a source of fluid under pressure, a second passage adapted to be connected to a fluid reservoir and third and fourth passages adapted to be connected to a fluid motor for directing fluid thereto to control and actuate the same, said spool having grooves therein adapted to communicate with certain of said housing means passages so as to control fluid flow through said valve, means for damping said valve spool against vibration and undesired movement while still permitting easy manual shifting of said valve spool, said means including portions of said housing means and said spool defining opposed chambers adapted to contain fluid which will react in opposite directions against said valve spool, passage means connecting each of said chambers to said housing means second passage in all positions of said valve spool, each of said chamber passage means including a restricted orifice to substantially restrict the flow of fluid from each of said chambers to said housing means second passage upon movement of said valve spool relative to said housing means, means for manually actuating said valve spool including an elongated lever, means pivotally supporting said lever adjacent one end thereof on said housing means, means adjacent the opposite end of said lever adapted to be connected with an actuator mechanism to cause said lever to pivotally move relative to said housing means, and means connecting an intermediate portion of said lever with said valve spool so that said pivotal movement of said lever will cause movement of said valve spool in said housing means bore, the overall length of said lever being at least twice the distance between the pivotal connection of said lever to said housing means and the connection of said lever to said valve spool so that a substantial mechanical davantage is obtained for actuating said valve spool through said lever.

3. In a vehicle power steering system, a fluid motor composed of a cylinder having a piston therein, a control valve including housing means, said housing means including a first passage connectible to a source of fluid under pressure, a second passage connectible to a fluid reservoir and third and fourth passages connected to said cylinder on opposite sides of said piston, said valve including an actuatable element movable to control and direct fluid through said valve between said first and second passages and said third and fourth passages to thereby control movement of said fluid motor, pressure relief valve means for said fluid motor, said pressure relief valve means including a valve body having a bore therein, a valve element slidably supported in said bore, a valve seat adjacent one end of said bore against which said valve element normally engages to prevent a flow of fluid through said pressure relief valve, the opposite end of said bore communicating with said first passage so that the pressure of fluid flowing through said first passage under pressure will normally hold said valve element in engagement with said seat, spring means urging said valve element against said valve seat, and passageway means communicating said cylinder on each side of said piston with said pressure relief valve bore and with the seated end of said valve element so that if the fluid pressure in said cylinder on either side of said piston exceeds a predetermined amount said valve element will be moved off of its seat to communicate said passageway means and thus the portions of said cylinder opposite sides of said piston to thereby relieve said excess pressure in said cylinder on either side of said piston.

4. A power steering control valve including housing means having a bore, a valve spool slidably disposed in said housing means bore, said housing means having a first passage communicating with said bore and adapted to be connected to a source of fluid under pressure, a second passage communicating with said bore and adapted to be connected to a fluid reservoir and third and fourth passages communicating with said bore and adapted to be connected to a fluid motor for directing fluid thereto, said spool having spaced grooves therein adapted to communicate said first and second housing means passages with said third and fourth passages, means for damping said valve spool against vibrations and undesirable movement while still permitting easy manual shifting of said valve spool, said means including portions of said housing means and of said valve spool defining opposed chambers for containing fluid which will react in opposite directions against said valve spool, passage means connecting each of said chambers to said housing means second passage in all positions of movement of said valve spool in said housing means, each of said chamber passage means having a portion of its length restricted in diameter to approximately .020 inch so as to substantially retrict any flow of fluid from each of said chambers to said housing means second passage upon movement of said valve spool relative to said housing means, and actuating means movably supported on said housing means and operatively connected with said valve spool for moving the same in opposite directions, thus actuating said control valve.

5. In a vehicle power steering system, a fluid motor composed of a cylinder having a piston therein, a control valve including housing means, said housing means including a first passage connectible to a source of fluid under pressure, a second passage connectible to a fluid reservoir and third and fourth passages connected to said cylinder on opposite sides of said piston, said valve including an actuatable element movable to control and direct fluid through said valve between said first and second passages and said third and fourth passages to thereby control movement of said fluid motor, pressure relief valve means for said fluid motor, said pressure relief valve means including a valve body having a bore therein, a valve element slidably supported in said bore, a valve seat adjacent one end of said bore against which said valve element normally engages to prevent a flow of fluid through said pressure relief valve, means for retaining said valve element in engagement with said valve seat to prevent a flow of fluid through said pressure relief valve means when fluid under pressure is flowing through said first passage but actuatable when fluid under pressure is not flowing through said first passage to permit movement of said valve element off of said valve seat and thus fluid flow through said relief valve, and passageway means communicating said cylinder on each side of said piston with said pressure relief valve bore and with the seated end of said valve element so that if the fluid pressure in said cylinder on either side of said piston exceeds a predetermined amount said valve element will be moved off of its seat to communicate said passageway means and thus the portions of said cylinder on opposite sides of said piston to thereby relieve said excess pressure in said cylinder on either side of said piston.

6. A vehicle power steering control valve including housing means having a bore, a valve spool slidably disposed on said housing means bore, said housing means having a first passage communicating with said bore and adapted to be connected to a source of fluid under pressure, a second passage communicating with said bore and adapted to be connected to a fluid reservoir and third and fourth passages communicating with said bore and adapted to communicate with a fluid motor, said spool having spaced grooves therein adapted to communicate said first and second housing means passages with said third and fourth passages, means for damping said valve spool against vibrations and undesired movement while still permitting easy manual shifting of said valve spool, said means including portions of said housing means and of said valve spool defining opposed chambers for containing fluid which will react in opposite directions against said valve spool, passage means connecting each of said chambers to said housing means second passage in all positions of movement of said valve spool in said housing means, each of said chamber passage means including a restricted orifice to substantially rectrict the flow of fluid from each of said chambers to said housing means second passage upon movement of said valve spool relative to said housing means, and an actuating member movably supported in said housing means and operatively connected with said valve spool for moving the same in opposite directions so as to actuate said control valve, said actuating means having a portion thereof extending exteriorly of said housing means, said actuating means and said valve spool being movable relative to said housing means by a force exerted on said actuating means of less than five pounds.

References Cited in the file of this patent
UNITED STATES PATENTS

| | | |
|---|---|---|
| 2,596,242 | Hill | May 13, 1952 |
| 2,809,611 | Van Meter | Oct. 15, 1957 |
| 2,910,050 | Dotter et al. | Oct. 27, 1959 |

FOREIGN PATENTS

| | | |
|---|---|---|
| 645,273 | Great Britain | Oct. 25, 1950 |

Notice of Adverse Decision in Interference

In Interference No. 92,922 involving Patent No. 3,016,049, C. J. Smith, C. E. Read and B. A. Wehring, Vehicle power steering control device, final judgment adverse to the patentees was rendered Feb. 21, 1963, as to claim 1.

[*Official Gazette April 30, 1963.*]